Apr. 24, 1923.
W. M. RAPP
COOLER
Original Filed Dec. 4, 1920    2 Sheets-Sheet 1
1,452,757
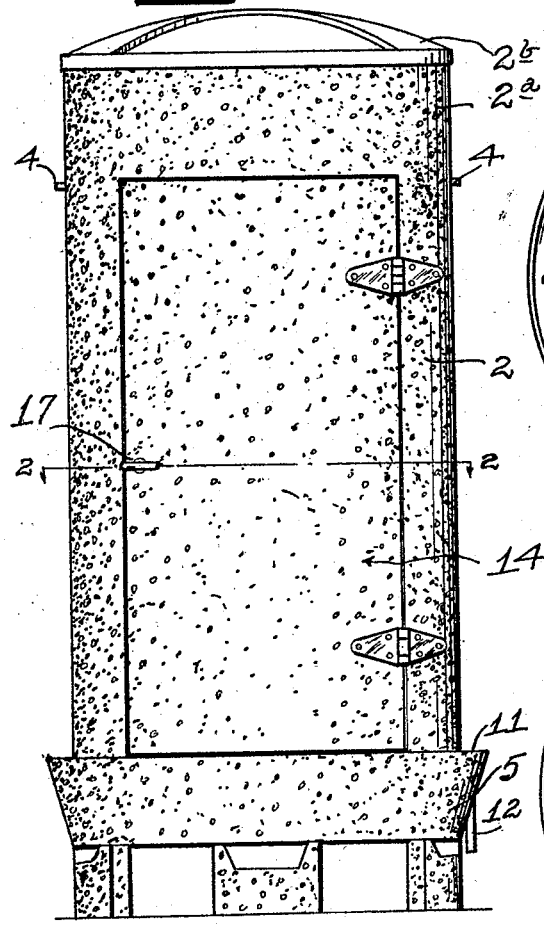
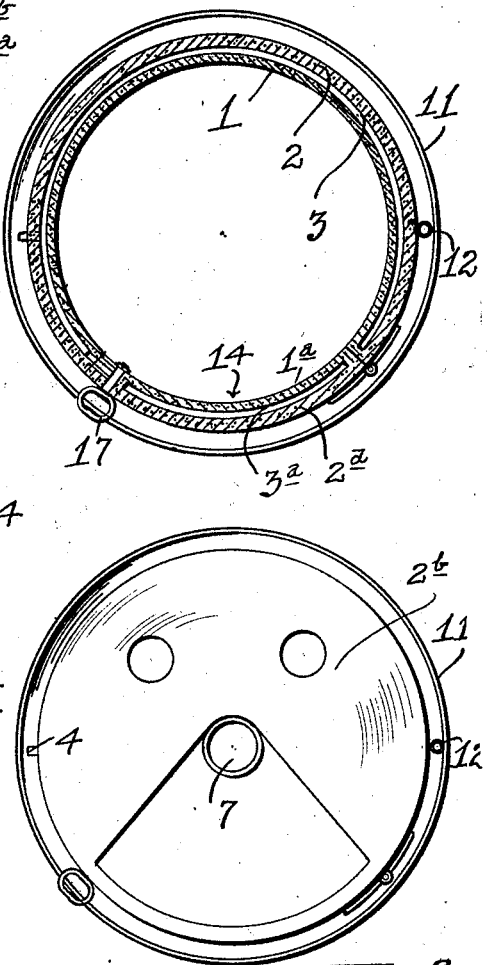
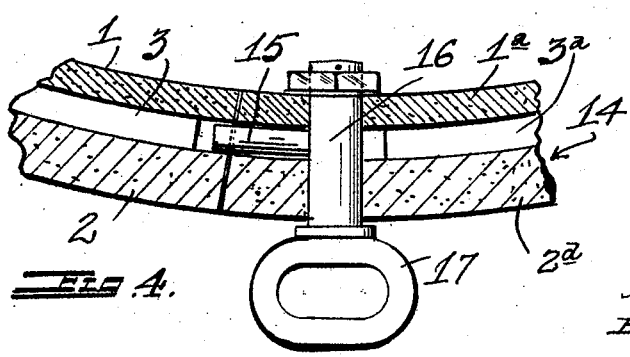
INVENTOR
William M. Rapp
BY
ATTORNEYS

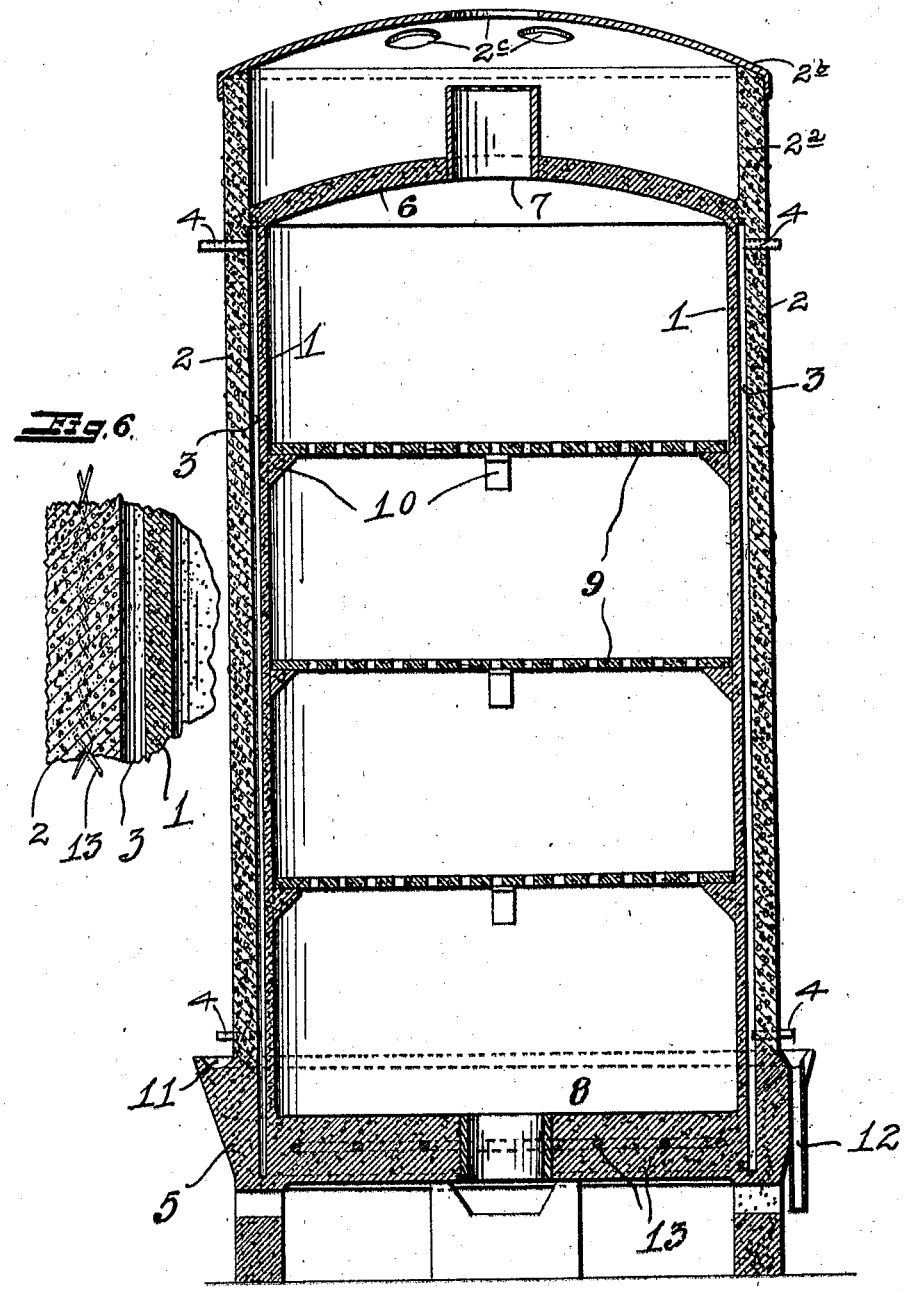

Patented Apr. 24, 1923.

1,452,757

UNITED STATES PATENT OFFICE.

WILLIAM M. RAPP, OF SAN FRANCISCO, CALIFORNIA, ASSIGNOR, BY DIRECT AND MESNE ASSIGNMENTS, TO VAPO CORPORATION, A CORPORATION OF CALIFORNIA.

COOLER.

Application filed December 4, 1920, Serial No. 428,361. Renewed December 21, 1922.

*To all whom it may concern:*

Be it known that I, WILLIAM M. RAPP, a citizen of the United States, and a resident of San Francisco, county of San Francisco, and State of California, have invented a new and useful Cooler, of which the following is a specification.

My invention while relating in general to coolers and refrigerating boxes has reference more particularly to an improved cooling receptacle for preserving food stuffs as used in households and other instances where it becomes desirable to maintain food stuffs which are more or less perishable in a fresh state of preservation.

The primary object of the invention is to provide an improved so-called iceless cooler which relies on effective water evaporatiton for realizing the cooling effect.

Broadly, the invention contemplates a receptacle preferably produced from a molded cementatory composition having certain properties which will enable a most effective water evaporation.

In the accompanying drawings I have selected a preferred embodiment of the invention for the purpose of illustration. In said drawings Figure 1 is a front elevation of the cooler;

Figure 2 is a cross section on the line 2—2 Figure 1;

Figure 3 is a top plan view;

Figure 4 is a detail cross sectional view showing the catch for the door;

Figure 5 is a vertical section and Figure 6 is a detail vertical sectional view.

Referring now to the drawings in detail, the cooler preferably comprises a molded cementatory structure including inner and outer walls (1) and (2) with an air space (3) therebetween. The air space (3) extends around the cooler and preferably being closed at the top and bottom but being open to the atmosphere through the tubes (4) arranged around the top and bottom of the space and extending through the outer wall (2).

For the purpose of convenience hereafter, the box-like inclosure formed by the walls of the cooler will be referred to as a receptacle and in this connection the same is provided with a bottom (5) and a top (6), both the top and bottom having ventilating openings (7) and (8) respectively for inducing free circulation of air through the receptacle. Suitable shelves (9) are ararnged in the receptacle and supported in spaced relation by the feet (10) which are molded on the inside surface of the inner wall (1). These shelves are perforated or provided with openings through their thickness so as to permit circulation of air through the ventilators (7) and (8).

The bottom (5) of the receptacle terminates the lower end of the air space and also includes a waste trough (11) which extends around the receptacle and empties through a trip (12). The outer wall (2) is of a greater height than that of the inner wall (1) and the top (6) is arranged at the termination of the inner wall but is molded through the inside surface of the outer wall and terminates the top of the air space. The continuation ($2^a$) of the outer wall together with the top (6) provides a water reservoir and the reservoir is capped by a suitable roof ($2^b$) which according to the showing in the present embodiment is a dome-shaped metal piece but it may be of cemented material. Suitable ventilating openings ($2^c$) may be arranged in the roof.

The walls and top and bottom of the receptacle may be properly reinforced as shown by the twisted rods (13) in the detail view of the walls in Figure 6 and as shown in the bottom (5) in Figure 5.

A portion of the area of the walls is displaced by a door (14) which may be hinged as shown and provided with a catch (15) which is carried by a spindle (16) of the handle (17) and confined in the air space ($3^a$) of the door with the same adapted to be moved in the air space ($3^a$) to describe the arc of a circle so that the end may be moved into and out of the air space (3) of the walls.

According to the preferred structure of the door, it will be made of an inner wall ($1^a$) and an outer wall ($2^d$) with the said air space ($3^a$) formed there between. The material of the door walls will preferably correspond to the material of the receptacle walls, likewise the air space ($3^a$) may correspond to the air space (3); that is to say, it will be of substantially the same transverse dimension and will furthermore be so arranged as to register with the air space (3) at the top and bottom of the door.

As previously mentioned, the receptacle including the top and bottom is preferably composed of a molded structure made from suitable cementatory materials. However, the method of molding, mixing and otherwise handling these materials for making up the cooler is important otherwise the desired results cannot be advantageously realized. In the first place to rely upon an effective cooling medium such as the evaporation of water the evaporation, must necessarily take place over a greater part of the receptacle wall area. Furthermore unusual care must be taken to exclude moisture or dampness from the inside of the receptacle, otherwise such condition will be conducive to molding or otherwise effecting the food stuff stored therein. Accordingly, I have found from actual experiments that by providing an air space such as (3) between the inner and outer walls, I can exclude dampness from the inside of the receptacle especially if I water proof the inside surface of the outer wall (2) and both the inside and outside surface of the inner wall (1). To effect this water proof I prefer to paint or otherwise coat these surfaces with a water proofing agent. In this connection I also suggest that the inside and outside of the bottom (5) likewise be treated as well as the inner and outer surface of the top (6). The water reservoir formed by the extending outer wall (2ª) and the top (6) may contain a quantity of water and to prevent the same from passing through the ventilating opening (7) in the top, a metal sleeve of a height above the normal level of the water is provided.

In selecting the material and the method of mixing and molding the same to form the inner wall (1) and the outer wall (2) as well as that of the bottom (5) and the top (6) which is of the same material as the inner wall (1), I have taken into consideration the results to be obtained, for instance, to realize the proper cooling effect within the receptacle by the evaporation of water I must distribute the water throughout the area of the outer wall (2), therefore, the wall must be porous. At the same time it should not be so porous as to induce a free circulation by capillary attraction from the top to the bottom of the receptacle as the volume of water will be too great to freely evaporate, then again, the amount of water used would be impractical.

For the inner wall I may use any ordinary cement or mixture of cement and sand, which should be made so as to render the inner wall water and moisture proof. The water proof treatment which I give the surfaces of the same will help to keep the inside of the receptacle dry.

It should be noted that the outer wall terminates above the waste trough (11) in the bottom (5) and that the top (6) is dome-shaped so that the greatest depth of water is around the joint between the extended part (2ª) of the outer wall and the top.

I claim:

1. A cooler of the class described, including a receptacle having double walls with a space there between, a top and bottom for the receptacle and a ventilator in both the upper and lower part of the receptacle; the outer wall being higher than the inner wall and consisting of a porous cementatory composition, and the inner wall as well as that of the top and bottom consisting of a moisture resisting cementatory composition, the said top being molded to the inner surface of the outer wall to terminate the said space at the top of the receptacle and providing a water reservoir above the receptacle, and the said bottom terminating the opposite end of the space and including a waste trough around the receptacle with the material composing the outer wall molded to the bottom above said trough.

2. A cooler of the class described, including a receptacle having double walls with an air space there between, a top and bottom, the outer wall being higher than the inner wall and consisting of a porous cementatory composition, and the inner wall as well as that of the top and bottom consisting of a moisture resisting cementatory composition, the said top being molded to the inner surface of the outer wall to terminate the said air space at the top of the receptacle and providing a water reservoir above the receptacle, and the said bottom terminating the opposite end of the air space and including a waste trough around the receptacle with the material composing the outer wall molded to the bottom above said trough.

3. A cooler of the class described, including a receptacle having double walls with an opened air space there between, a top and bottom for the receptacle and a ventilator in both the upper and lower part of the receptacle, the outer wall being higher than the inner wall and consisting of a porous cementatory composition, and the inner wall as well as that of the top and bottom consisting of a moisture resisting cementatory composition, a door of substantially the same structure as that of the walls opening into the side of the receptacle, the said top being molded to the inner surface of the outer wall to terminate the said air space at the top of the receptacle and providing a water reservoir above the receptacle, and the said bottom terminating the opposite end of the air space and including a waste trough around the receptacle with the material composing the outer wall molded to the bottom above said trough.

4. A cooler of the class described, including a receptacle having double walls with an opened air space there between, a top and bottom for the receptacle and a ventilator in both the upper and lower part of the receptacle, the outer wall being higher than the inner wall and consisting of a porous cementatory composition, and the inner wall as well as that of the top and bottom consisting of a moisture resisting cementatory composition, a door of substantially the same structure as that of the walls opening into the side of the receptacle, the said top being molded to the inner surface of the outer wall to terminate the said air space at the top of the receptacle and providing a water reservoir above the receptacle, and the said bottom terminating the opposite end of the air space and including a waste trough around the receptacle with the material composing the outer wall molded to the bottom above said trough the inner and outer exposed areas of the walls with exception of the outside surface of the outer wall as well as the inner and outer exposed areas of the top and bottom being water proofed.

WILLIAM M. RAPP.